(No Model.)

E. W. HERENDEEN.
SPRING TOOTH HARROW.

No. 401,833. Patented Apr. 23, 1889.

WITNESSES.
Albert E. Leach
M. H. Thompson.

INVENTOR.
Edward W. Herendeen
By his Attorney.
Wm. B. H. Dowse.

N. PETERS, Photo-Lithographer, Washington, D. C.

UNITED STATES PATENT OFFICE.

EDWARD W. HERENDEEN, OF GENEVA, NEW YORK.

SPRING-TOOTH HARROW.

SPECIFICATION forming part of Letters Patent No. 401,833, dated April 23, 1889.

Application filed January 3, 1888. Serial No. 259,662. (No model.)

*To all whom it may concern:*

Be it known that I, EDWARD W. HERENDEEN, a citizen of the United States, residing at Geneva, in the county of Ontario and State of New York, have invented certain new and useful Improvements in Spring-Tooth Harrows, of which the following is a specification.

My invention consists of an improved detachable seat and other devices for curved spring harrow-teeth, as hereinafter described.

Figure 1:
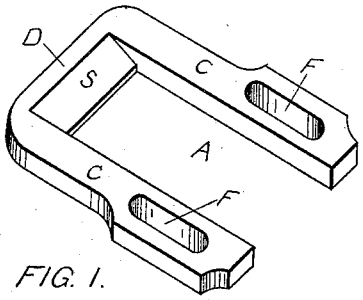
Figure 2:
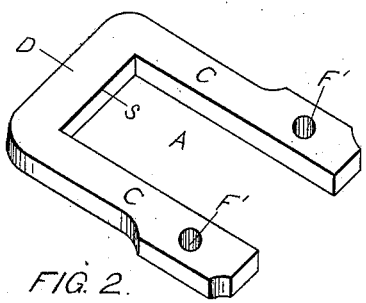
Figure 3:
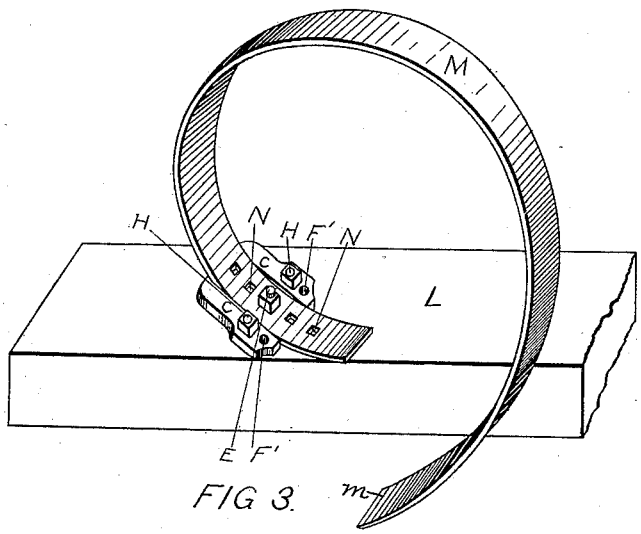
Figure 4:
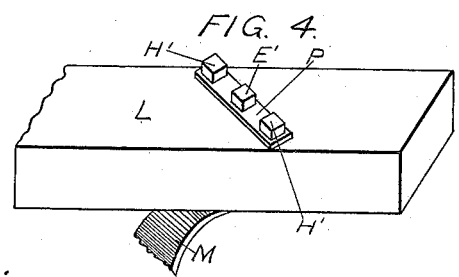

Of the drawings, Figures 1 and 2 are perspective views of my improved seat. Fig. 3 shows the tooth secured in place on the harrow-frame bar. Fig. 4 shows the under side of the harrow-frame bar.

A is a detachable seat, made preferably of malleable metal and consisting of the two arms C C and the bearing portion D, which I have shown in Fig. 1 as having a beveled seat, S. This, however, is not necessary, as the bearing part may be of any other desired form, as that shown in Fig. 2. Enlarged portions of the arms C C of the detachable seat are perforated either with one or more corresponding holes, F', or with slots F, to receive the bolts H H, by which the seat is secured to the harrow-frame. These holes or slots make the seat adjustable. The seat may be fastened either on the upper or the lower surface of the frame-bar; but for ease of adjustment I prefer to fasten it on the upper surface, as shown in Fig. 3. It is secured by the two bolts H H, passing through holes in the bar L. The distance between the arms C C is sufficient so that the said arms may embrace the harrow-tooth when secured in place.

The curved spring-tooth M is preferably provided near its upper end with a series of holes, N N, and the tooth is placed directly against the frame-bar L, so as to bear against it and the connecting portion D of the detachable seat A. The fastening-bolt E passes through a hole in the frame-bar L and through the tooth. The bolt is preferably inserted from beneath, with its head E' on the under side of the bar L and the nut above the tooth. By this means the point *m* of the tooth M can be very easily raised or lowered by simply unscrewing the nut from the fastening-bolt E, lifting off the tooth, and replacing it in a different hole N, when a series of holes is used, on the bolt E, thus obviating the necessity of removing the bolt. When two or more holes or slots are employed in the arms C C of the said seat, by loosening the nut on the bolt E, as well as those on the bolts H H, the point *m* of the tooth may be raised or lowered considerably by moving the detachable seat back and forth on the bar L, according as the bearing portion is nearer to or farther from the bolt E. In this manner a certain degree of adjustability of the tooth M may be readily effected independent of its series of holes and without removing the tooth from the bar.

With a series of holes in each tooth at corresponding distances from its end, all the teeth may be easily and quickly readjusted in height by simply moving along each tooth the same number of holes on its fastening-bolt without removing the bolt.

My improved detachable seat allows the curved spring-tooth to be easily secured to any plain harrow-bar. In combination with the fastening-bolt it furnishes a very firm and rigid means of securing the tooth in place. I do not limit myself to the exact form of seat shown and described, as I believe that I am the first to produce a detachable seat for a spring-tooth in no way attached to the tooth.

It is of great importance to the operator to be able while at work in the field to quickly and easily change the height of the points of the teeth. The arrangement herein shown, with a series of holes in the tooth, which is clamped by a simple nut, and the adjustable seat readily accomplish this desired result.

I do not claim a curved cultivating-tooth in combination with a supporting-frame and a detachable U-shaped seat having a bearing portion, whereby the tooth is in part held resting on the frame and in part on the detachable seat; but

I claim—

1. In a harrow, a detachable U-shaped seat having a bearing portion, S, and perforated arms C C, in combination with fastening-bolts, whereby the seat is adjustable, substantially as and for the purposes described.

2. In a harrow, a tooth provided with a series of holes, in combination with the frame-bolts and a detachable U-shaped seat having a bearing portion, S, and arms C C, substantially as described.

3. A harrow provided with a curved spring-tooth and a detachable U-shaped seat, each independently attached to the harrow, substantially as and for the purposes described.

In witness whereof I have hereunto set my hand.

EDWARD W. HERENDEEN.

Witnesses:
WM. B. H. DOWSE,
A. E. LEACH.